Sept. 22, 1942.    L. L. HAYNES    2,296,385
FLUID PRESSURE CREATING DEVICE
Filed June 4, 1940
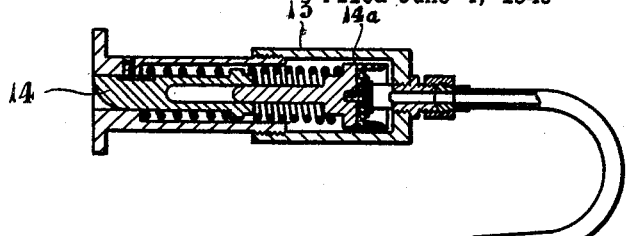
Fig. 1.
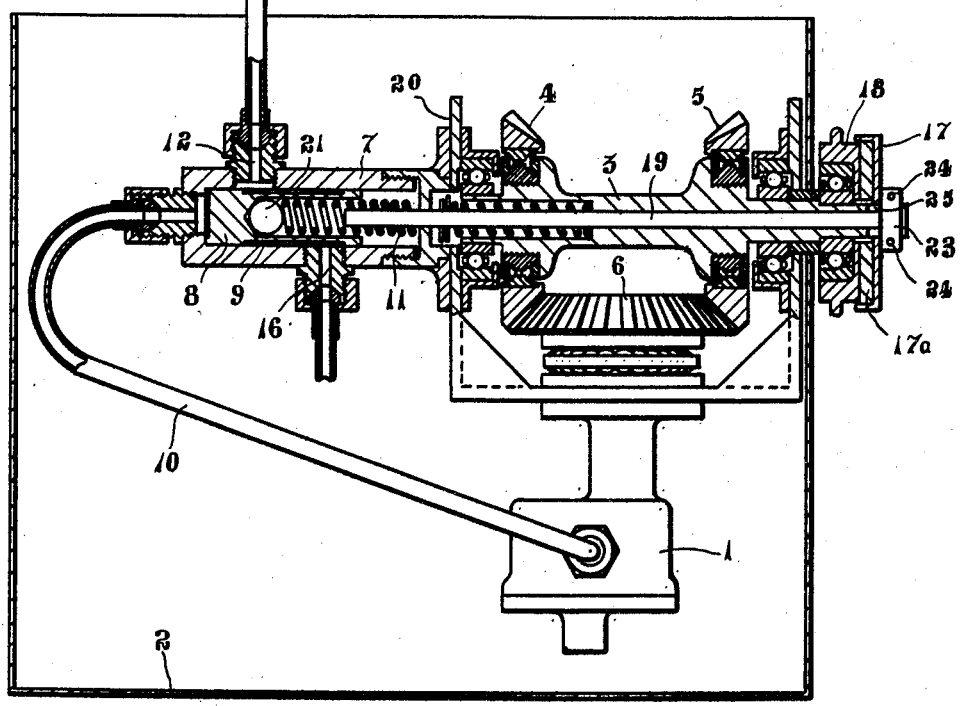
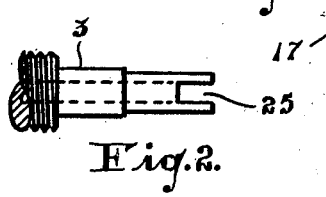
Fig. 2.   Fig. 5.
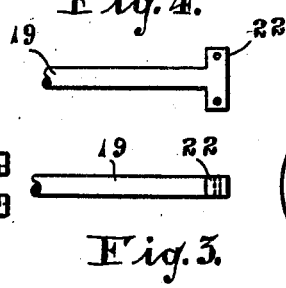
Fig. 4.
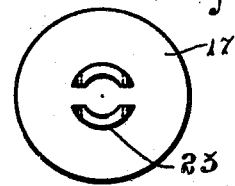
Fig. 3.   Fig. 6.
L. L. Haynes
INVENTOR.
BY C. A. Knowles
ATTORNEYS.

Patented Sept. 22, 1942

2,296,385

UNITED STATES PATENT OFFICE 2,296,385

FLUID PRESSURE CREATING DEVICE

Lionel Leslie Haynes, Bromsgrove, England

Application June 4, 1940, Serial No. 338,788
In Great Britain August 3, 1939

3 Claims. (Cl. 103—23)

This invention relates to a fluid pressure operated locking device, and it has for its object a locking device which is maintained in the locking position by fluid pressure supplied by a rotary pump substantially direct through a distributing chamber, the pressure in which controlls the speed of the pump, so that the speed of the pump is maintained within predetermined limits irrespective of the speed of the member driving the pump and so that when the pump ceases to rotate the locking device is quickly released.

In order that the invention may be clearly understood, and readily carried into effect, reference may be had to the accompanying drawing, on which:

Figure 1 is a sectional elevation of a device constructed according to this invention, the pump and parts on the pump shaft being shown in full.

Figure 2 is an elevation of the end portion of the driving shaft.

Figure 3 is an elevation of the outer end portion of the clutch control rod.

Figure 4 is an elevation of the portion of the clutch control rod shown by Figure 3 but at right angles.

Figure 5 is a side elevation of the movable clutch member detached, and

Figure 6 is an outer face view of the part shown by Figure 5.

According to a convenient embodiment of this invention, the pressure creating device is adapted to actuate a locking bolt 14 by pressure applied to the piston 14a mounted in the cylinder 13 and as set forth in my co-pending application for patent Ser. No. 338,787. A rotary pump 1 is mounted in an oil tank 2 and is driven from a driving shaft 3 which is rotated in any convenient manner by a machine when the machine is running or from a vehicle when the vehicle is running. The driving shaft 3 as set forth in my co-pending application Ser. No. 338,789, has two bevelled wheels 4 and 5 thereon which are geared together by a third bevel wheel 6 which drives the pump 1. The two bevel wheels 4 and 5 are mounted on the driven shaft 3 with a free wheel action in opposite directions, so that when the driving shaft 3 rotates in one direction the drive is taken from one free-wheel bevel wheel, whilst when the drive is in the reverse direction the drive is taken through the other free-wheel bevel wheel, the result being that the pump is always driven in the same direction, irrespective of the direction of rotation of the driving shaft.

The pump delivers the oil from the tank 2 into the pressure control member which comprises a pressure cylinder 7 in which a piston 8 is mounted. The piston 8 has an annular channel 9 between the front and rear ends and a conduit 10 from the pump delivers the oil into the outer end of the cylinder 7 and forces the piston inwardly against a spring 11. When the piston has moved inwardly to compress the spring 11 and build up the predetermined pressure, an outlet feed port 12 is opened by the outer end of the piston through which the oil passes to the piston cylinder 13 of the locking bolt 14. When the pump ceases to be driven the pressure in the pressure control cylinder 7 drops and the piston moves back by the spring pressure thereon and the said outlet feed port 12 communicates with the annular space 9 around the piston. A release port 16 is also provided in the wall of the cylinder opposite the annular groove in the piston, so that the pressure of oil from the piston cylinder 13 of the locking bolt can escape through the release port 16 and the conduit leading therefrom back to the oil reservoir.

When the shaft 3 is driven by a moving vehicle, for instance, the speed of the driving shaft will normally vary very considerably in accordance with the variation in speed of the vehicle, consequently the pump, if driven at such variable speed would build up considerable variation in pressure. In order that the pump will maintain a substantially constant pressure, a speed control device is provided for limiting the speed at which the pump can be driven and consequently limiting the pressure output. For this purpose the driven component part 17 of a clutch is spring pressed against the driving component 18 (which may have sprocket teeth thereon for chain drive) and the driven component part of the clutch is carried by a rod 19 which passes axially through the said driving shaft 3 into the pressure control cylinder 7, such cylinder being mounted on a bearing member or bracket 20 for the driving shaft. The outer end of this rod 19 passes into the bore of the piston 8 in the control cylinder to co-act with the bearing ball 21 at the closed end of the piston bore. When the pressure is built up in the pressure control cylinder beyond the predetermined limit the ball 21 presses on the end of the clutch control rod 19 and produces slip in the clutch or de-clutches. By this means the rotational speed of the pump is limited irrespective of the speed of the machine or vehicle which is the source of the driving power. The end of the rod 19 has a T-shaped head 22 and is fixed to the split boss 23, on the clutch member 17, by means of the pins 24. The head 22 is free to slide in the slot 25 in the end of the driving shaft 3. The clutch member 17 is thus connected to the shaft 3 to drive the same, whilst the clutch member 17 is free to slide endwise on the shaft with the rod 19 against the pressure of the spring 19a. The clutch member 17 may have a lining disc 17a of any known friction material used in connection with friction clutches or applied to the lining of brake shoes.

In the case of a train, for instance, the pump can be arranged to build up the necessary pressure immediately the train is started. As the train gathers speed the operation of the clutch prevents the pump being driven at too high a speed. When therefore the train or machine is started, the locking bolt will be projected substantially immediately, thereby locking the doors or the like and when the train or machine stops, the pressure on the locking bolt 14 will be immediately relieved, so that it will automatically be retracted. The fluid pressure may however be utilised to actuate any desired movable part for any desired purpose.

The fluid may be liquid or gaseous.

I claim:

1. A fluid pressure creating device, comprising a rotary pump, a combined pressure building-up and pressure distributing cylinder fed by the pump, a piston mounted in the cylinder, a spring compressed by the piston to control the pressure of the fluid to be distributed from the cylinder, a slipping clutch for driving the rotary pump at a constant speed irrespective of the speed of an input member driving the pump, and a member controlling the clutch projecting into the said cylinder and adapted to be moved by the piston, against spring pressure independent of the spring pressure controlling the movement of the piston, to cause the clutch to slip should the input drive for the pump be greater than a predetermined speed.

2. A fluid pressure creating device, comprising a rotary pump, a combined pressure building-up and pressure distributing cylinder fed by the pump, a piston mounted in the cylinder, a spring in the cylinder compressed by the piston to control the pressure of the fluid to be distributed from the cylinder, a slipping clutch for driving the rotary pump at a constant speed irrespective of the speed of an imput member driving the pump, comprising a clutch member driven by the imput driving member and rotatably mounted on a shaft mounted co-axially of the said cylinder, a slipping clutch member mounted on a clutch control rod which passes axially down the shaft and enters the cylinder, means for slidably and non-rotatably connecting the slipping clutch control rod to the said shaft, toothed gearing driving the pump from the said shaft, and a spring acting on the said clutch control rod to press the clutch parts together and adapted to be compressed by the said piston acting on the control rod to cause the clutch to slip should the imput drive for the pump be greater than a predetermined speed.

3. A fluid creating device, comprising an oil container, a driving shaft in the container and having one end projecting through the wall thereof, a rotary pump in the container, means for driving the rotary pump from the driving shaft so that a uni-directional drive is given to the pump whether the driving shaft is driven clockwise or anti-clockwise, a combined pressure building up and pressure distributing cylinder fed by the pump, a piston mounted in the cylinder, a spring in the cylinder compressed by the piston to control the pressure of the fluid to be distributed from the cylinder, a slipping clutch on the said projecting end of the driving shaft for driving the pump at a constant speed irrespective of the speed of an imput member driving the pump and comprising a clutch member driven by the imput driving member and rotatably mounted on the shaft, a slipping clutch member fixed on a clutch control rod which passes axially down the shaft and enters the cylinder, and means for slidably and non-rotatably connecting the slipping clutch control rod to the said shaft and a spring acting on the said clutch control rod to press the clutch parts together and adapted to be compressed by the said piston acting on the control rod to cause the clutch to slip should the imput drive for the pump be greater than a predetermined speed.

LIONEL LESLIE HAYNES.